March 14, 1944. G. A. WAHLMARK 2,344,432
MECHANISM FOR ACTUATING MACHINE TOOL SUPPORTS
Filed Aug. 3, 1940 7 Sheets-Sheet 1
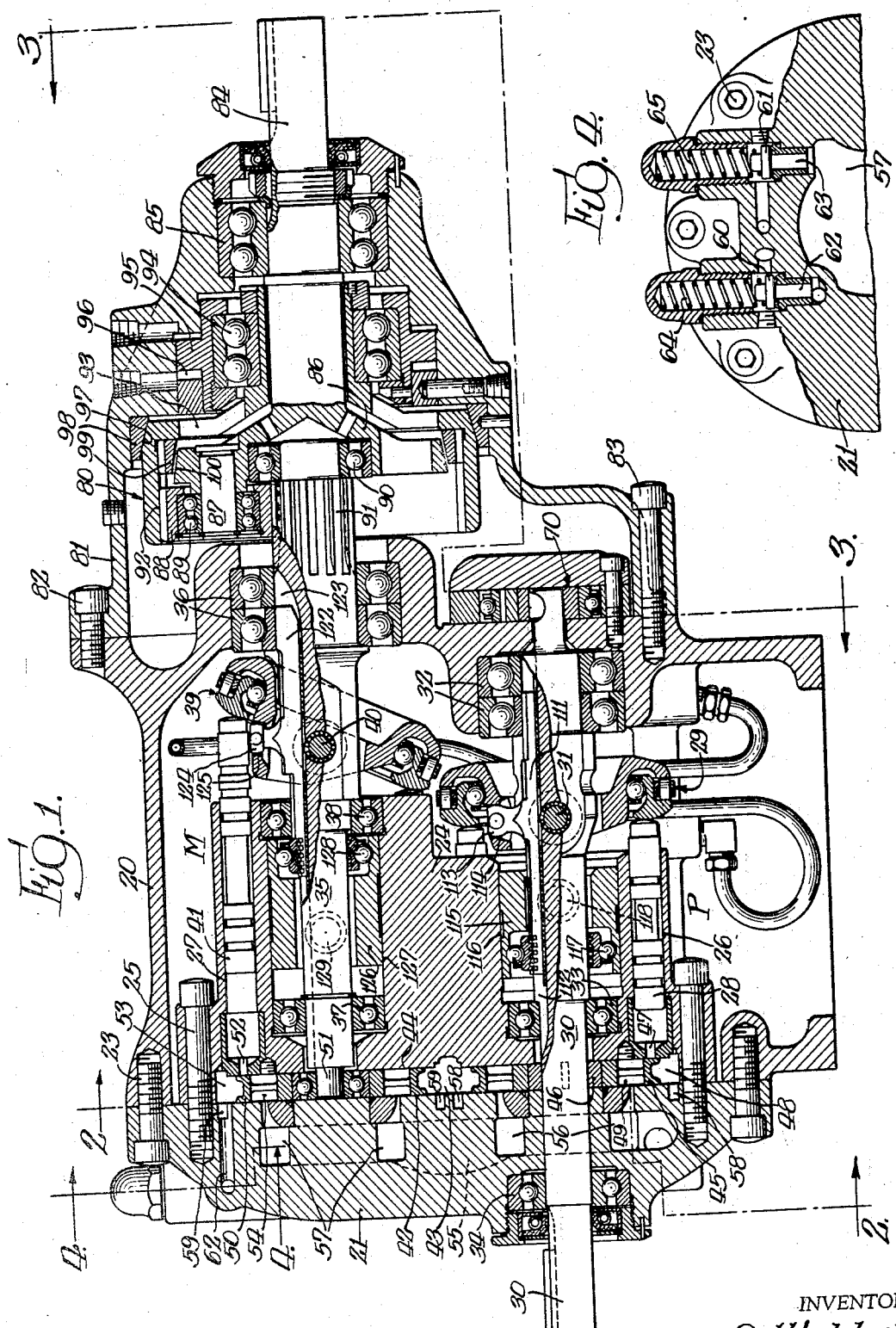
INVENTOR.
Gunnar A. Wahlmark.
BY
his Atty.

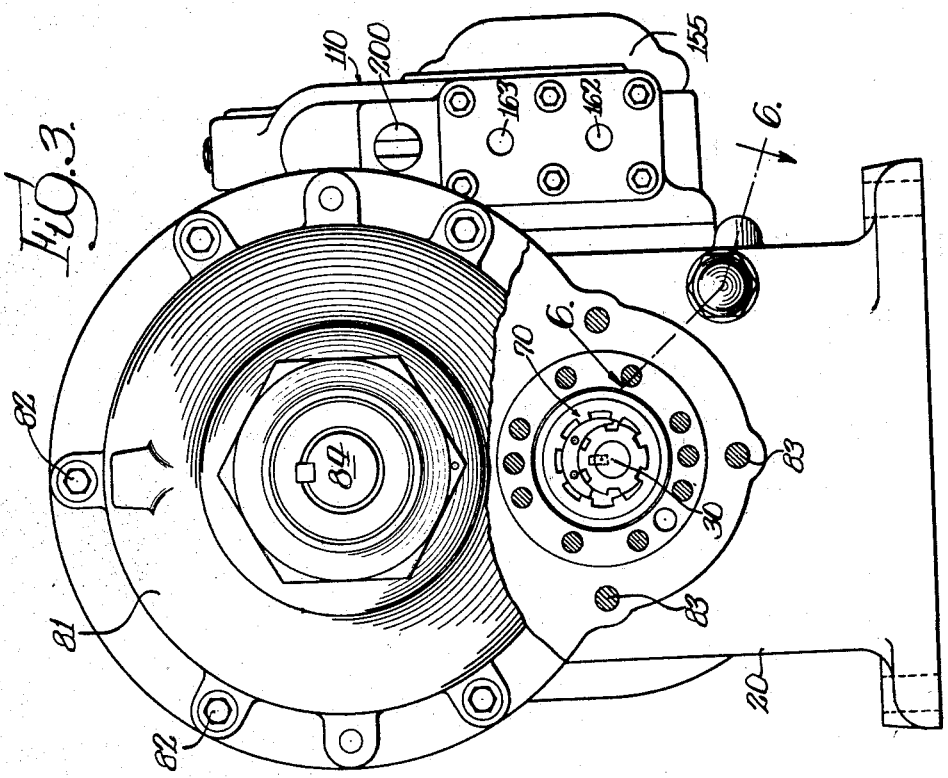
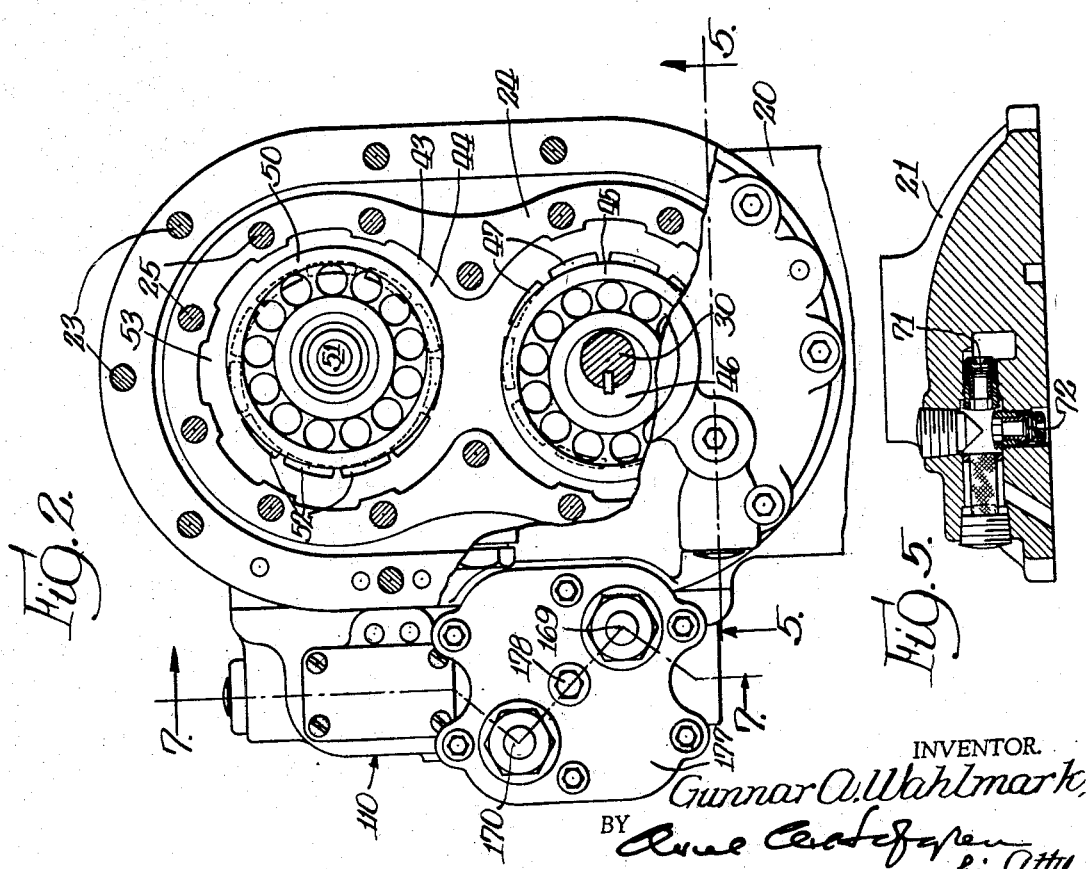

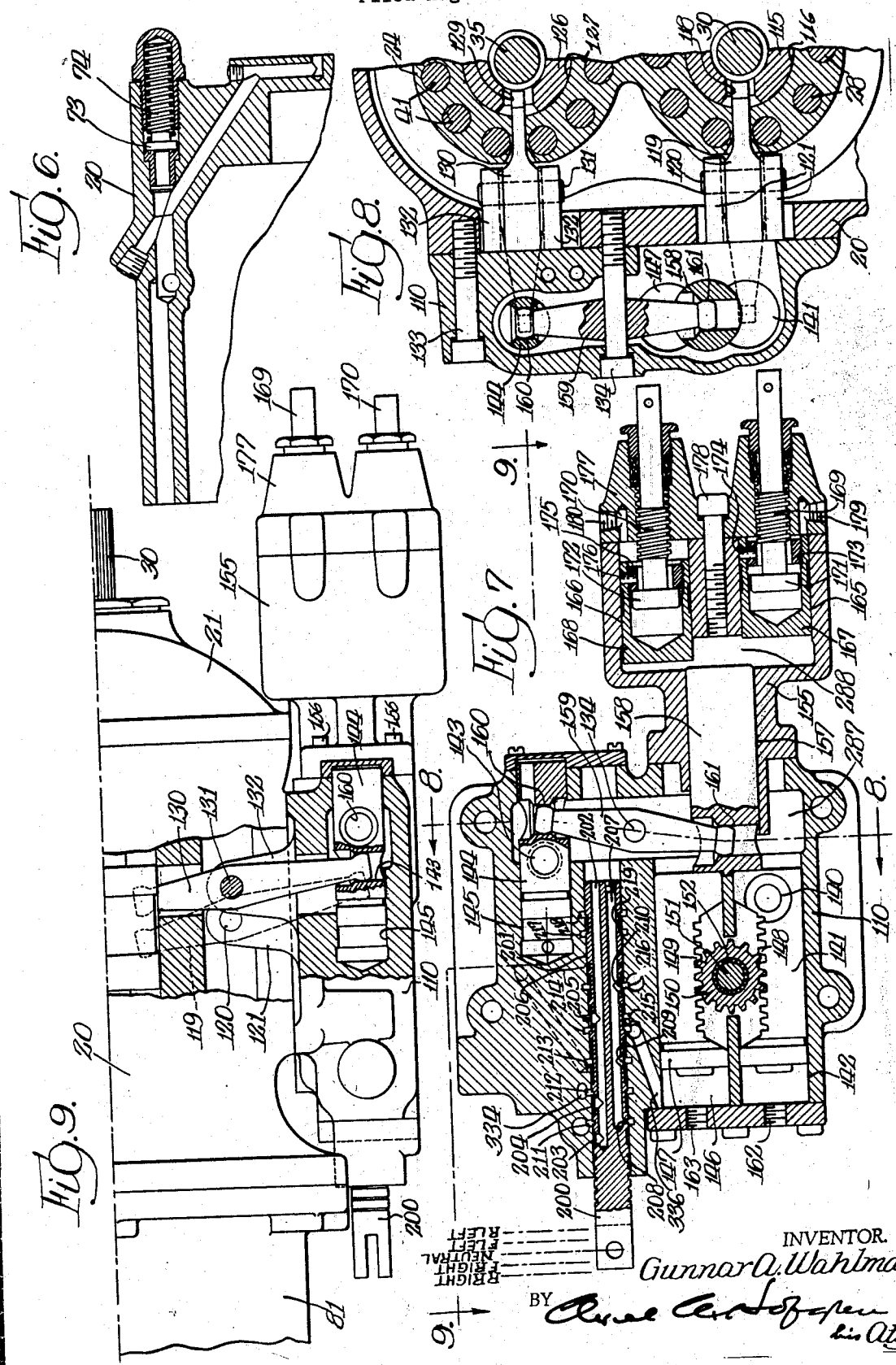

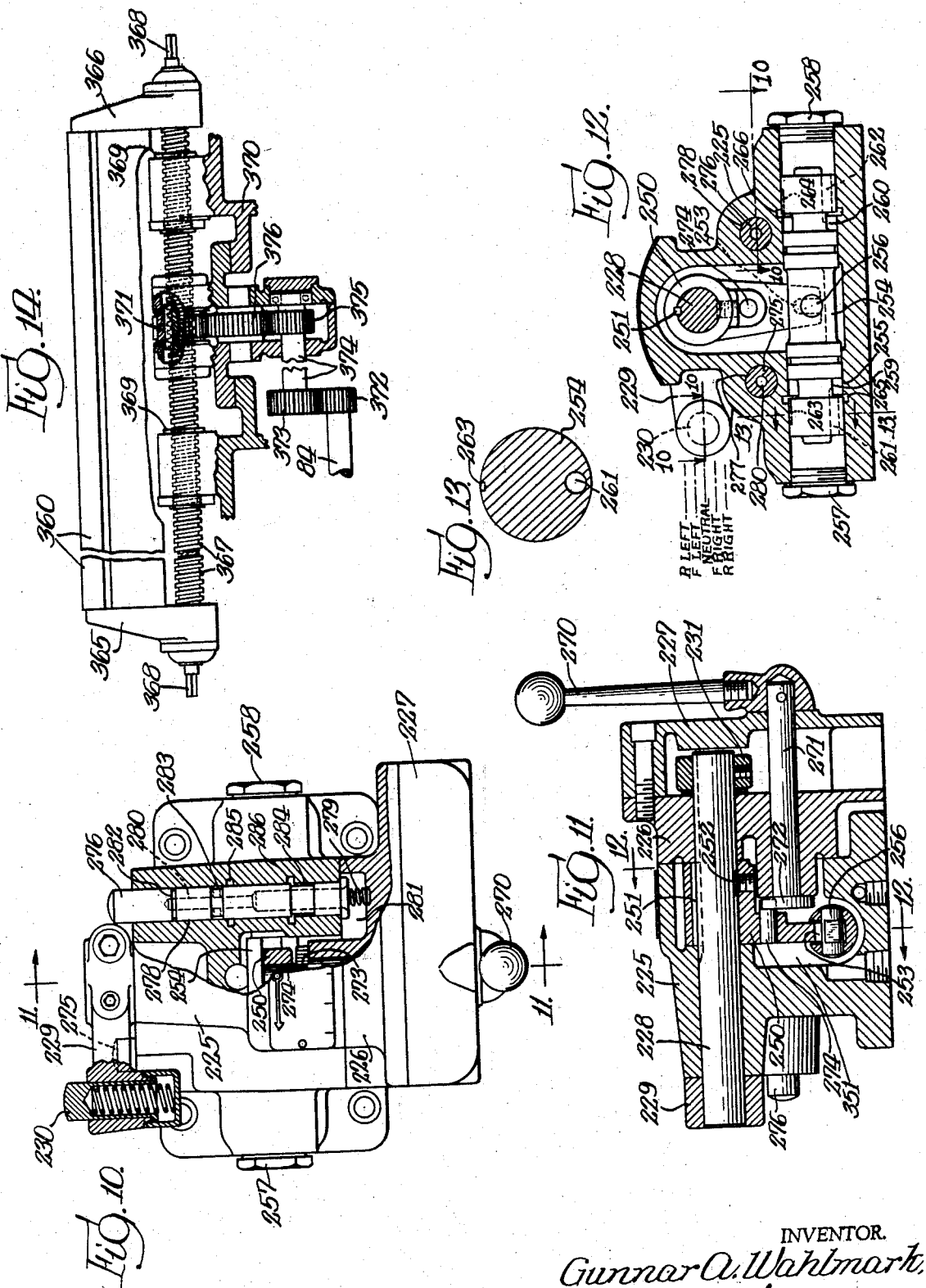

Fig. 15

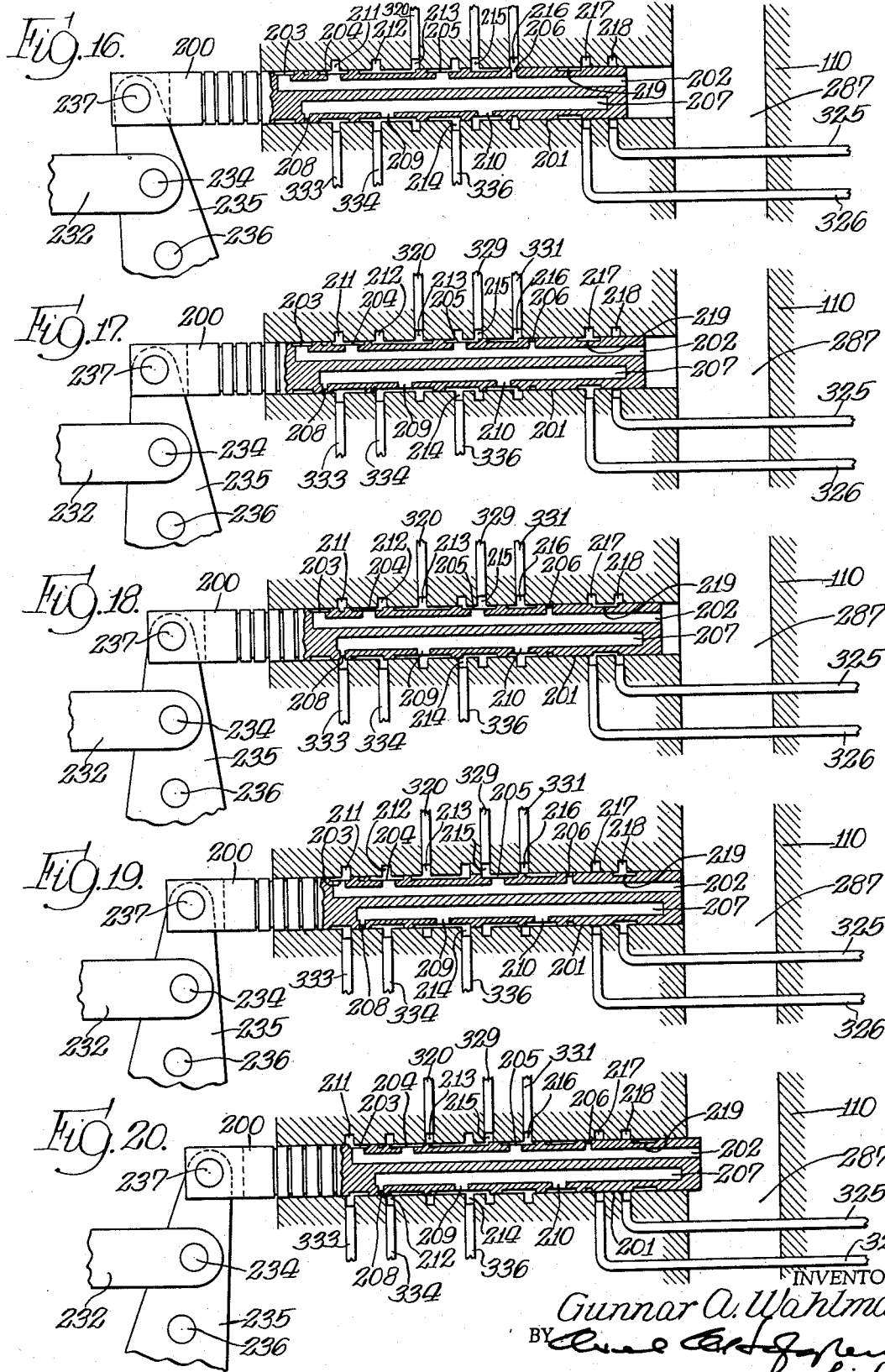

March 14, 1944.  G. A. WAHLMARK  2,344,432
MECHANISM FOR ACTUATING MACHINE TOOL SUPPORTS
Filed Aug. 3, 1940  7 Sheets-Sheet 7

INVENTOR.
Gunnar A. Wahlmark,
BY his Atty.

Patented Mar. 14, 1944

2,344,432

UNITED STATES PATENT OFFICE 2,344,432

MECHANISM FOR ACTUATING MACHINE TOOL SUPPORTS

Gunnar A. Wahlmark, Rockford, Ill.

Application August 3, 1940, Serial No. 350,475

23 Claims. (Cl. 90—21.5)

This invention relates more particularly to a mechanism for actuating a machine tool support at feed and traverse rates, it being the general object of the invention to provide a new and improved mechanism of this character.

Another object is to provide such a feed traverse mechanism enabling a support to be operated in forward and reverse directions at feed and traverse rates, together with means for obtaining different forward and reverse feed rates.

Another object is to provide such an actuating mechanism for machine tool supports having means for automatically controlling the movements of the support through different cycles of operation.

Another object is to provide an adjustable speed and reversible fluid transmission mechanism for actuating a machine tool support, together with novel means for controlling the operation of the transmission mechanism to obtain automatic cyclic operation of the support.

Another object is to provide a new and improved valve mechanism for controlling the reversing of a machine tool support actuated by a fluid controlled means and particularly to provide such a valve mechanism which will insure quick reversal at preselected points in the travel of the support.

Other objects will become readily apparent from the following detailed description taken in connection with the accompanying drawings, wherein:

Fig. 1 is a longitudinal central vertical section through a fluid transmission forming a part of the preferred form of the invention.

Fig. 2 is a view partly in section taken along the line 2—2 of Fig. 1 and looking in the direction of the arrows.

Fig. 3 is a view partly in section taken along the line 3—3 of Fig. 1 and looking in the direction of the arrows.

Fig. 4 is a fragmentary section along the line 4—4 of Fig. 1.

Fig. 5 is a fragmentary section along the line 5—5 of Fig. 2.

Fig. 6 is a fragmentary section along the line 6—6 of Fig. 3.

Fig. 7 is a section approximately along the line 7—7 of Fig. 2.

Fig. 8 is a section approximately along the line 8—8 of Fig. 7.

Fig. 9 is a section approximately along the line 9—9 of Fig. 7.

Fig. 10 is a plan view of a control unit partly in section along the lines 10—10 of Fig. 12.

Fig. 11 is a vertical section along the line 11—11 of Fig. 10.

Fig. 12 is a vertical section approximately along the line 12—12 of Fig. 11.

Fig. 13 is an enlarged section along the line 13—13 of Fig. 12.

Fig. 14 is a front elevational view of a milling machine table, partly in section and diagrammatic.

Fig. 15 is a hydraulic circuit diagram.

Figs. 16, 17, 18, 19 and 20 are enlarged diagrammatic views of a valve in, respectively, its rapid traverse right, feed right, neutral, feed left, and rapid traverse left, positions.

Figure 21:
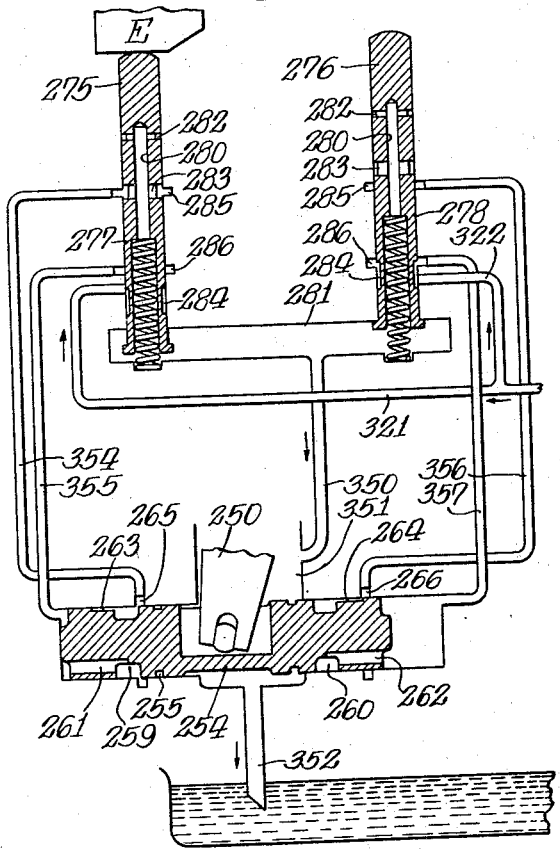
Figs. 21 and 22 are enlarged diagrammatic views of a reversing valve mechanism illustrating two operative positions thereof.

While there is illustrated in the drawings and herein described in detail a preferred form of the invention adapted to actuate a movable support in a machine tool, it is to be understood that the invention is not limited to the particular form and arrangement shown, it being contemplated that various changes may be made by those skilled in the art without departing from the spirit and scope of the appended claims.

In the form selected for purposes of disclosure, the invention is particularly adapted for use in reciprocating a machine tool support such as the work table of a milling machine and is arranged to provide for movement of the table in forward and reverse directions and at feed and traverse rates in each direction. Furthermore, the invention embodies means for preselecting a feed rate for the table when moving in a forward direction which is different from the feed rate for the table when moving in a reverse direction, and automatic control means obtaining a definite cycle of operation of the table after the table has been started manually. Included in the actuating mechanism for the table is a fluid transmission illustrated more particularly in Figs. 1 to 9. With reference to Figs. 1 to 6, the fluid transmission comprises a casing 20 having a detachable end member 21 secured thereto by a plurality of bolts 23. The lower portion of the casing is occupied by a pump P and the upper portion of the casing is occupied by a motor M. A single cylinder block 24 is secured to the end member 21 of the casing by means of a plurality of bolts 25 and has an annular series of pump cylinders 26 and an annular series of motor cylinders 27 formed therein. Pistons 28 in the pump cylinders are arranged to be actuated by means of a wobbler device 29 which is pivotally mounted on a drive shaft 30 by means of a pin 31. As illustrated in Fig. 1 the wobbler 29 is shown in a neutral position, the wobbler being adjustable angularly in both directions from the neutral position to provide for reversing the flow of fluid from the pump as well as adjusting the output volume of the pump. The shaft 30 is rotatably mounted in the casing 20 by means of anti-friction bearings 32, in the cylinder block 24, by a ball bearing 33, and in the end member 21 by a ball bearing 34. The projecting end of the shaft 30 is intended for connection to a suitable electric motor or other prime mover.

A shaft 35 for the motor M is rotatably mounted in the casing 20 by means of ball bearings 36 and in the cylinder block 24 by means of ball bearings 37 and 38. This shaft carries a wobbler device 39 which is pivotally mounted on the shaft by means of a pin 40 so that the wobbler may be adjusted angularly on the shaft to vary the stroke of the motor pistons 41.

The inner surface 42 of the end member 21 is preferably flat and forms one wall of a valve chamber 43 (Figs. 1 and 2) in which the valves of both the pump and motor operate. The cylinder block 24 is recessed as illustrated to provide an opposed flat surface 44 forming the opposite wall of the valve chamber. Operable in the lower portion of the valve chamber 43 and to control the flow of fluid to and from the pump cylinders 26 is a wheel-like valve 45 of the type more fully disclosed and claimed in my prior Patent No. 2,190,812 dated February 20, 1940. This valve is mounted on an eccentric 46 on the shaft 30 and is operable to connect the pump cylinder ports 47 alternately to the peripheral portion 48 of the valve chamber and to the inner portion 49. Operable in the upper portion of the valve chamber 43 is a wheel-like valve 50 for the motor. This valve is mounted on an eccentric pin 51 on the motor shaft 35 and is operable during rotation of the shaft to connect the motor piston ports 52 alternately to the peripheral portion 53 of the valve chamber and the inner portion 54 thereof. As will be apparent from Figs. 1 and 2, the provision of a common valve chamber for the pump and valves provides a direct connection for the flow of fluid from the pump to the motor (or vice versa) through the narrow midportion of the valve chamber. A second passage for the flow of fluid between the pump and the motor is provided in the end member 21 at 55, this passage having an annular portion 56 in the lower part of the end member communicating with the inner portion 49 of the valve chamber and having an annular portion 57 in the upper part of the end member communicating with the inner portion 54 of the valve chamber. As illustrated in Fig. 1 the end member 21 is provided with annular recesses 58 and 59 which communicate with the valve chamber 43 and serve to enlarge its volumetric capacity.

Figure 15:
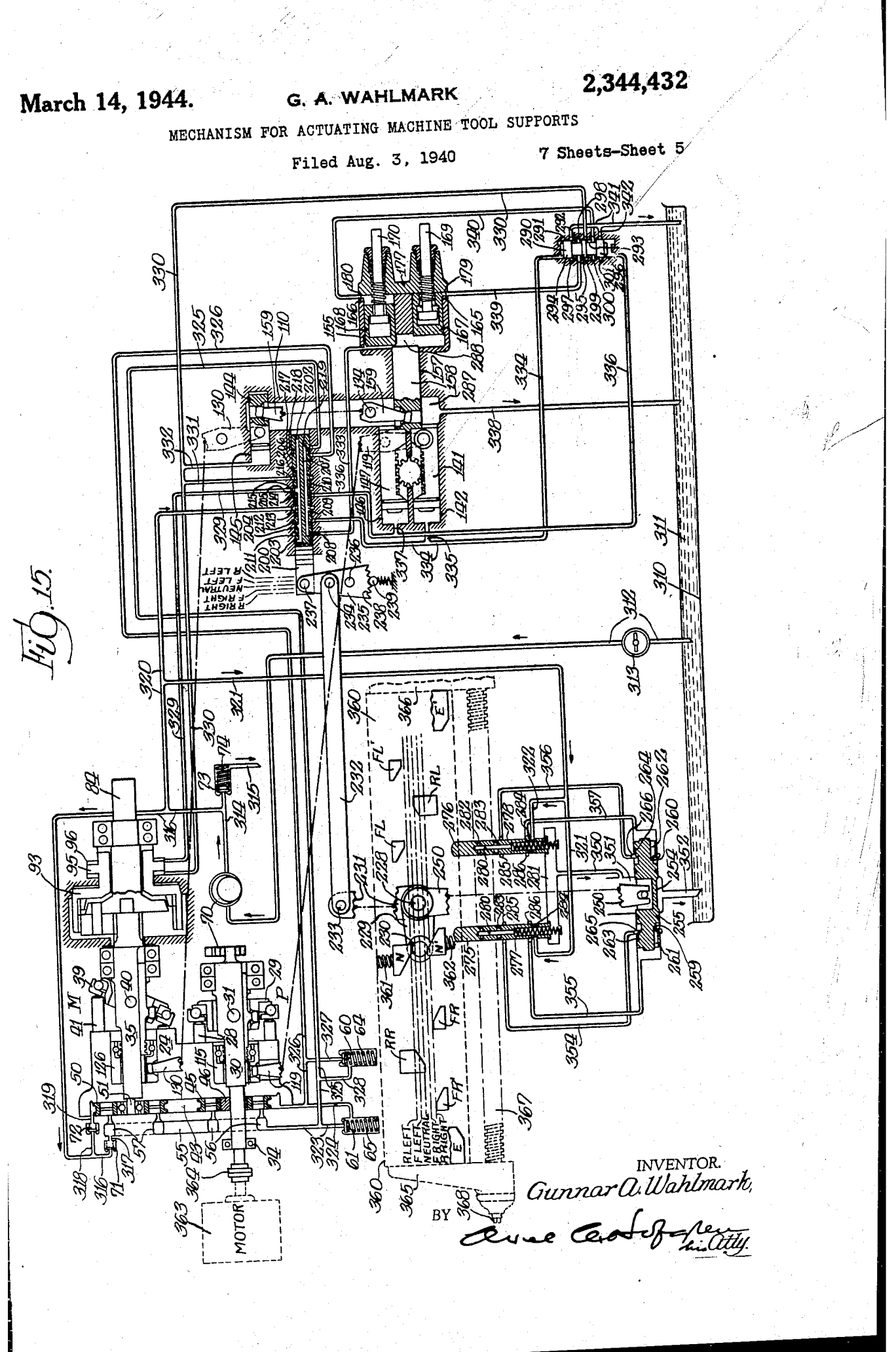

As illustrated in Fig. 4, a pair of high pressure relief valves 60 and 61 are provided to limit the pressures in the passages between the pump and motor. These valves are normally seated against tubular bushings 62 and 63 supported in the end member 21 and are held in their seated positions by means of coiled springs 64 and 65. The connections between these high pressure relief valves and the passages between the pump and the motor will be more fully described in connection with the diagram in Fig. 15.

Preferably a rotary pump 70 (Figs. 1 and 3) is mounted on the casing 20 and driven from the right hand end of the pump shaft 30. The pump 70 as illustrated is of the form shown in my prior Patent No. 2,132,813 dated October 11, 1938, and serves to supply fluid at approximately one hundred fifty pounds per square inch pressure to the pump-motor circuit to maintain this circuit full at all times, and for actuating control mechanisms. The flow of fluid from the pump 70 will be described in more detail in connection with the diagram of Fig. 15. Cooperating with the pump 70 to maintain the pump-motor circuit full of fluid are a pair of check valves 71 and 72 (Fig. 5), the operation of which will also be described in connection with the diagram of Fig. 15.

Preferably a relief valve 73 as illustrated in Fig. 6 is backed by a spring 74 which may be adjusted so that the valve 73 opens on pressures in excess of one hundred fifty pounds per square inch. This valve is connected in the output circuit of the pump 70 to limit the pressure of the make-up and control fluid as hereinafter more fully described.

In actuating a table for a milling machine it is desirable to obtain a plurality of relatively slow feed speeds and also a relatively high or rapid traverse speed, the feed speeds being utilized while the milling cutter is operating on the work and the rapid traverse speed being utilized for advancing the work to the cutter and for returning the table upon completion of a cut. While the pump P and motor M combine to provide a large number of different speeds of the motor shaft 35, the invention provides additional means for utilizing these motor shaft speeds for obtaining traverse movements of the table and for reducing these speeds still farther to obtain feed movements of the table. As illustrated most particularly in Fig. 1, the transmission includes a planetary gearing 80 enclosed in a housing 81 secured to the right hand end of the casing 20 by means of bolts 82 and 83. A driven shaft 84 is rotatably mounted in the housing 81 in alignment with the motor shaft 35 by means of a ball bearing 85. The shaft 84 has an outwardly extending flange 86 on its inner end carrying a plurality of pinion shafts (preferably three) 87 on which pinions 88 are mounted by means of ball bearings 89. Preferably a ball bearing 90 is inserted between the flange portion 86 and the adjacent end of the motor shaft 35. Near the end of the motor shaft 35 are formed sun gear teeth 91 which mesh with the pinions 88. A ring gear 92 is slidable longitudinally in the housing 81, the ring gear having an integral inwardly extending flange 93 which is supported by means of a ball bearing 94 on a piston member 95 reciprocably mounted in a cylinder 96. The ring gear 92 has a beveled annular brake face 97 engageable with a corresponding beveled stationary brake ring 98 when the piston 95 is moved toward the right (Fig. 1). The ring gear 92 also carries an annular clutch member 99 provided with a beveled face engageable with a corresponding beveled clutch face 100 on the flanged portion 86 of the shaft 84, so that when the piston 95 is moved toward the left the clutch faces 99 and 100 are engaged and the planetary gearing elements are locked together to rotate as a unit. Under this condition the driven shaft 84 will rotate in unison with the motor shaft 35. With the ring gear held stationarily against the brake member 98 the driven shaft 84 will be operated at a speed lower than that of the motor shaft 35 due to the reduction caused by the planetary gearing which is then free to operate. The automatic operation of the planetary change gearing will be described hereinafter in connection with the diagram of Fig. 15. The control mechanism for the wobbler devices of the pump and motor will now be described.

Referring generally to Figs. 1 to 3 and 7 to 9, the means for controlling the angular positions of the pump and motor wobbler devices 29 and 39 is contained in the casing 20 and a housing 110 secured to one side thereof. The pump wobbler device 29 is adjustable by means including a member 111 slidable in a keyway 112 extending longitudinally in the pump shaft 30. The member 111 has a radially extending portion 113 engaging in a radial opening 114 in the wobbler device so that movement of the member 111 toward the right from the position shown in Fig. 1 pivots the wobbler device in a clockwise direction to cause a flow of fluid from the pump to the motor operating the motor in a forward (table) direction, whereas movement of the member toward the left rotates the wobbler device in a counterclockwise direction causing a reverse flow of fluid from the pump to the motor and a reversal of the motor and table movement. A tubular control member 115 for the pump is slidably mounted in a bore 116 in the cylinder block 24 and is connected to the member 111 by means of ball bearing 117. The control member 115 has a radial bore 118 therein (Figs. 1 and 8) and into this bore extends one end of a lever 119 which is mounted on a vertical pivot pin 120 supported on the housing 110 by means of lugs 121. The motor wobbler device 39 has a similar slidable control member 122 positioned in a keyway 123 in the motor shaft 35 and provided with an outwardly extending arm 124 which engages in a bore 125 in the wobbler device. A tubular control member 126 is slidable in a bore 127 in the cylinder block 24 and is connected to the member 122 by means of a ball bearing 128. The tubular member 126 has a radially extending bore 129 (Figs. 1 and 8) which receives one end of a lever 130 pivotally mounted on a vertical pin 131 secured to the housing 110 by means of lugs 132. Since the housing 110 is detachably secured to the casing 20 by means of bolts 133 and 134, the levers 119 and 130 can be removed with the housing 110 by loosening these bolts.

In the form illustrated herein the pump control lever 119 and the motor control lever 130 are arranged to be operated by piston and cylinder devices and, furthermore, are arranged to have their operative positions determined by additional piston and cylinder devices. Thus, the lever 119 extends through a hollow portion of the housing 110 and into a diametrical bore 140 in a piston 141 which is slidably mounted in a cylinder 142. The lever 130 projects through a hollow portion of the housing 110 and into a diametrical bore 143 in a piston 144 which is slidably mounted in a cylinder 145 positioned parallel to and above the cylinder 142. Arranged immediately adjacent and parallel to the cylinder 142 is a cylinder 146 containing a piston 147, the pistons 141 and 147 having cut away portions provided with rack teeth 148 and 149 respectively which mesh with pinion 150 rotatably mounted in the housing 110 by means of a bearing shaft 151 and a roller bearing 152. This geared connection between the pistons 141 and 147 permits actuation of the lever 119 by the piston 147, as well as by the piston 141.

As illustrated in Figs. 7 and 9 a casing 155 is secured to the housing 110 by means of a plurality of bolts 156. The casing 155 has a cylindrical bore 157 therein positioned parallel to but midway between the axes of the pistons 141 and 147. A cylindrical plunger 158 is slidably mounted in the bore 157 and at its left hand end projects into the paths of the right hand ends of the pistons 141 and 147. The plunger 158 is connected to the piston 144 by means of a lever 159 which is mounted on the bolt 134 which extends through the midportion of the lever and acts as a pivot therefor. The upper end of the lever 159 enters a bore 160 in the piston 144, whereas the lower end of the lever enters a bore 161 in the plunger 158. The connections just described are such that by supplying fluid to the cylinder 142 through the port 162 the piston 141 will be moved toward the right and will cause a swinging movement of the pump control lever 119 in a counterclockwise direction as viewed in Fig. 9, this causing a movement of the tubular control member 115 toward the right in Fig. 1 and an adjustment of the wobbler device 29 in a clockwise direction about the pivot 31. If fluid is supplied to the cylinder 146 through the port 163 the rack and pinion connection will cause a movement of the piston 141 toward the left (Fig. 7) thus causing an adjustment of the wobbler device 29 in a counterclockwise direction from that illustrated in Fig. 1. Regardless of whether the piston 141 moves to the right or the piston 147 moves to the right, the plunger 158 will be moved to the right and through the intervening lever 159, piston 144 and lever 130 will cause an adjustment of the motor control member 126 toward the left from the position illustrated in Fig. 1 so as to reduce the stroke of the motor pistons as the stroke of the pump pistons is increased. Since the movement of the motor wobbler device 39 is always in the same direction from a neutral position, the direction of rotation of the motor shaft will be reversed when the fluid flow from the pump is reversed.

The extent to which the pump and motor wobbler devices are pivoted by action of the pistons 141 and 147 is determined by additional piston and cylinder devices mounted in the casing 155 (Figs. 7 and 9). In this casing are arranged parallel cylinders 165 and 166 having pistons 167 and 168 therein, respectively. These pistons are hollow and have extending into their open or right hand ends screw devices 169 and 170 respectively which are provided with heads 171 and 172. A ring 173 is screw-threaded into the piston 167 and secured there by means of a pin 174 so that the movement of the piston 167 toward the left (Fig. 7) is determined by engagement of the ring 173 with the head 171 of the screw device 169. A similar ring 175 is screw-threaded into the piston 168 and secured thereto by a pin 176 so that the movement of the piston 168 toward the left is limited by engagement of the ring 175 with the head 172 of the screw device 170. The screw devices 169 and 170 are threaded through a cap member 177 secured to the casing 155 by means of bolts 178. As described more fully in connection with the diagram of Fig. 15, fluid may be supplied to the right hand end of the cylinder 165 through a port 179 or to the cylinder 166 through a port 180 to maintain the corresponding piston in its left hand position as determined by its associated screw device. The pistons 167 and 168, therefore, are operable to limit the movement of the plunger 158 toward the right in Fig. 7 and thereby operate to limit the movement of the wobbler devices and to determine the operative positions thereof.

Movements of the various control piston and cylinder devices are herein shown to be controlled by means including a main valve 200, cylindrical in form and slidably mounted in a bore 201 in the housing 110. This valve, as illustrated in Figs. 7 and 15 to 20, has five positions, a central neutral position (Figs. 15 and 18) and feed and traverse positions on each side of neutral, the feed and traverse positions to the left of the neutral position (Figs. 16 and 17) being arranged to effect movement of the table toward the right as shown in Fig. 15 and the positions to the right of neutral (Figs. 19 and 20) being arranged to effect movement of the table toward the left. The valve 200 has a longitudinally extending port 202 therein which communicates with annular recesses 203, 204, 205, and 206 in the periphery of the valve. The port 202 extends all the way to the right hand end of the valve so as to discharge into the valve bore which in turn discharges into a return line to the tank as hereinafter more fully described. The valve also has a longitudinally extending port 207 which communicates with annular recesses 208, 209 and 210 in the periphery of the valve. The valve bore 201 is provided with annular grooves 211, 212, 213, 214, 215, 216, 217, and 218, the function of which will become more readily apparent from the description of the circuit diagram of Fig. 15 hereinafter.

In its preferred form the invention includes means for automatically shifting the valve 200 in order to obtain an automatic cycle of operation of the table. This means is illustrated principally in Figs. 10 to 13 and will now be described.

Illustrated in Figs. 10 to 13 is a control unit arranged to be mounted on the bed of a milling machine immediately in front of the table. This unit has a housing consisting of a first part 225, a second part 226, and a cover member 227, all suitably bolted together. A shaft 228 is rotatably mounted in the housing and has at its outer end an arm 229 adapted to be moved to and between five different positions corresponding to the five positions of the valve 200. As illustrated in Fig. 10 the arm 229 carries a spring pressed plunger 230 located in a position where it may be engaged by various dogs secured to the front edge of the table, as hereinafter more fully described. On its inner end the shaft 228 carries an arm 231 which is arranged to be connected to the valve 200 by means of linkage as illustrated in Fig. 15 consisting of a link 232 secured at one end to the arm 231 by a pin 233 and secured at its other end by a pin 234 to the midportion of an arm 235 pivotally mounted on a stud 236. The free end of the arm 235 is pivotally connected to the valve 200 by means of a pin 237. Preferably the arm 235 is provided with five notches 238 in which a spring pressed ball 239 is engageable to form a detent device adapted to hold the valve 200 releasably in its different operative positions. These connections between the shaft 228 and the valve 200 cause the valve to assume its different position corresponding to the positions of the arm 229.

Figure 22:
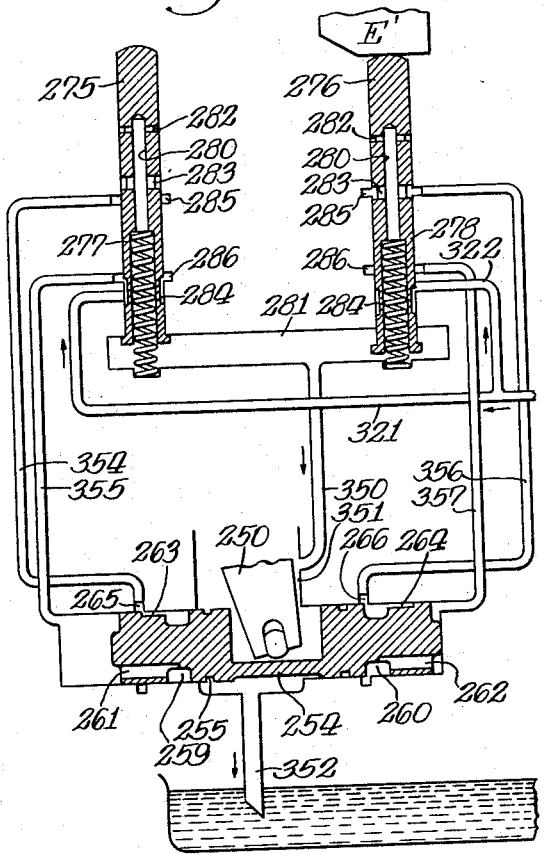

Although the arm 229 may be actuated directly by dogs on the table when the valve 200 is to be shifted from a feed or traverse position to neutral or from the feed position on one side of neutral to the traverse position on the same side of neutral (or vice versa), the invention provides additional means for shifting the valve 200 through its neutral position in order to reverse the table. Thus, as shown in Figs. 10 to 13, the shaft 228 has a downwardly extending arm 250 secured thereto by means of a key 251 and a set screw 252. The lower end of this arm is slotted at 253 and enters a recess in the midportion of a cylindrical plunger or piston 254 which is slidably mounted in a cylinder bore 255 in the housing part 225. The piston 254 carries a pin 256 which passes through the slot 253 in the arm 250 so that the shaft 228 may be rocked by movement of the piston 254 in the cylinder bore 255. The ends of the cylinder bore 255 are preferably closed by plugs 257 and 258 which also serve as stop members for the piston 254. The piston is provided with annular grooves 259 and 260 and with longitudinal ports 261 and 262 extending between the grooves 259 and 260 respectively and the opposite ends of the piston. The piston is also provided with longitudinally extending peripheral recesses 263 and 264 which extend outwardly from the grooves 259 and 260 respectively but stop short of the ends of the piston. The cylinder bore 255 is provided with annular grooves 265 and 266 which cooperate with the piston 254 in a manner more fully described in connection with the diagrams of Figs. 15, 21 and 22.

It is contemplated that the piston 254 will normally be maintained in hydraulic balance so that it will remain in any position to which it may be moved when the shaft 228 is rotated by means of the arm 229 and a table dog engaging the plunger 230 on said arm. Since the piston 254 is normally maintained in hydraulic balance the shaft 228 may also be moved to any one of its five angular positions by means including a manual control handle 270 which is mounted on the outer end of a shaft 271 rotatably mounted in the housing parts 226 and 227. The rear end of the shaft 271 has an outwardly extending flange 272 provided with a radial slot 273 in which a pin 274, carried on the arm 250, extends. Means is provided to unbalance the piston 254 and to move it in one direction or another to an extreme position when the table is to be reversed. As illustrated herein this means includes a pair of cylindrical valves 275 and 276 slidably mounted in horizontal bores 277 and 278 respectively in the housing part 225. These valves have portions projecting outwardly from the housing toward the left as illustrated in Fig. 11 and have flanges on their inner ends which engage the inner end surface of the housing part 225 to limit outward movement of the valves in the housing. Coiled springs 279 are provided to maintain the valves 275 and 276 in their extended positions. Each one of these valves has a longitudinally extending axial port 280 which communicates at the inner end of the valve with a chamber 281 in the housing. Each valve has annular recesses 282 and 283 which communicate with the port 280, and a wide annular recess 284. The bores in which the valves are mounted have annular grooves 285 and 286. The valves 275 and 276 are arranged to be actuated by "end" or "reversing" dogs on the table and function to control the unbalancing of the piston 254 hydraulically as hereinafter more fully described.

Reference is now made to Fig. 15 which illustrates diagrammatically various parts of the invention, together with the hydraulic circuit associated with these parts. Generally, the different elements in Fig. 15 are numbered to correspond with the other figures. In addition to the parts already described, the hydraulic circuit includes a cylindrical valve 290 which is reciprocably mounted in a cylindrical bore 291 and has annular recesses 292 and 293 providing glands 294, 295, and 296. The valve bore 291 has annular grooves 297, 298, 299, 300, and 301. This valve assists in the control of the feed speed pistons 167 and 168 and is shifted when the direction of table movement is reversed so as to select the other feed speed piston.

In the lower portion of Fig. 15 there is illustrated a tank 310 containing a supply 311 of fluid, such as oil. A suction line 312 which includes a strainer 313 extends from the tank 310 to the intake of the make-up pump 70. The output of the pump 70 passes through a conduit 314 to the relief valve 73. Any fluid passing the relief valve is arranged to return to the tank 310 through a conduit 315. A conduit 316 extends from the conduit 314 to the check valve 71 and any fluid which passes the check valve flows through a conduit 317 into the annular passage 57 so as to replenish any fluid leaking from passage 57, its connecting passages 55 and 56, the pump and motor valve chambers and other portions of the circuit connected thereto. A branch conduit 318 extends from the conduit 316 to the check valve 72 and any fluid which passes said check valve flows through a conduit 319 to the valve chamber 43 and functions to replenish any oil which has leaked therefrom. The check valves 71 and 72 are arranged to prevent reverse flow therethrough when the conduits 317 and 319 receive high pressure fluid from the pump P. The check valves function alternately to pass fluid when the pump-motor passage to which they are connected is operating as a return passage from the motor to the pump. Fluid from the make-up pump is also conducted from the conduit 316 through a conduit 320 to the annular groove 213 in the valve bore 201 and functions to supply control fluid at one hundred fifty pounds pressure to the valve bore. Control fluid is also supplied from conduit 320 by means of a conduit 321 to the valve bore 277, a branch conduit 322 conducting fluid from the conduit 321 to the valve bore 278.

Fluid from the pump-motor circuit is also conducted to the valve 200. Thus a conduit 323 extends from the annular portion 56 of the pump-motor passage 55 to the high pressure relief valve 61. Any fluid passing the relief valve flows through a conduit 324 back to the valve chamber 43, the relief valve 61 functioning when the passage 55 operates as a supply passage from the pump to the motor. A conduit 325 connects with the conduit 323 and extends to the annular groove 218 in the valve bore 201. A conduit 326 connects with the conduit 324 and extends to the groove 217 in the valve bore 201. A conduit 327 connects the conduit 326 to the high pressure relief valve 60 and a conduit 328 connects the low side of the relief valve 60 with the conduit 325. It will be understood that the conduits 323 and 324 carry fluid alternately at one hundred fifty pounds pressure and the high working pressure (one thousand pounds or more) depending upon the direction of flow from the pump P. When the valve 200 is in its neutral position as illustrated in Fig. 15, the annular grooves 217 and 218 are connected together by an annular recess 219 in valve 200 to establish communication between the inlet and outlet passages of the pump P.

The piston and cylinder device 95, 96 for shifting the feed-traverse clutch 93 is arranged to receive low pressure control fluid from the valve bore 201. Thus a conduit 329 connects at one end to the right hand end of the cylinder 96 and at its other end to the annular groove 215 in the valve bore 201. A conduit 330 connects at one end with the left hand end of the cylinder 96 and at its other end with the annular groove 299 in the valve bore 291. A branch conduit 331 connects with the conduit 330 and with the annular groove 216 in the valve bore 201. A second branch conduit 332 connects with the conduit 330 and with the left hand end of the cylinder 145.

The connections from the valve 200 to the reversing pistons 141 and 147 and the feed control pistons 167 and 168 include a conduit 333 extending from the groove 211 in the valve bore 201 to the left hand end of the cylinders 165 and 166 in which the feed control pistons are located. A conduit 334 extends from the groove 212 in the valve bore 201 to the upper end of the valve bore 291 and a branch conduit 335 from the conduit 334 communicates with the left hand end of the cylinder 142. A conduit 336 extends from the groove 214 in the valve bore 201 to the lower end of the valve bore 291 and a branch conduit 337 connects the conduit 336 with the left hand end of the cylinder 146. The chamber 287 in the housing 110 serves as a return passage for fluid and is connected by means of a conduit 338 to the tank 310. A conduit 339 connects the right hand end of the cylinder 165 with the groove 298 in the valve bore 291. A conduit 340 connects the right hand end of the cylinder 166 with the groove 300 in the valve bore 291. A conduit 341 connects the groove 297 of the valve bore 291 with the tank 310, and a conduit 342 connects the groove 301 of said valve bore with the conduit 341.

As mentioned hereinbefore a conduit 321 together with a branch conduit 322 conducts control fluid to the valve bores 277 and 278 of the reversing valves 275 and 276. The chamber 281 into which the inner ends of the valves 275 and 276 discharge is connected to the tank 310 through intermediate conduit 350, chamber 351, in the housing member 225, and a conduit 352. A conduit 354 connects the groove 285 of the valve bore 277 to the groove 265 of the piston bore 255. A conduit 355 connects the groove 286 of the valve bore 277 with the left hand end of the cylinder bore 255. A conduit 356 connects the groove 285 of the valve bore 278 with the groove 266 in the piston bore 255. A conduit 357 connects the groove 286 in the valve bore 278 with the right hand end of the cylinder bore 255.

At 360 is indicated a milling machine table carrying a plurality of dogs FR, FR', RR, N, N', FL, FL' and RL arranged to engage and actuate the arm 229, and through the intervening connections, the valve 200. The table 360 also carries reversing or end dogs E and E' arranged to engage and depress the valves 275 and 276, respectively, to effect a reversal of the table movement. The dogs FR and LR may be referred to as feed dogs since they are effective to move the control valve 200 from traverse positions into feed positions. Likewise the dogs RR and LR may be referred to as rapid traverse dogs since they are effective to move the valve 200 from feed positions to rapid traverse positions. The dot-dash lines adjacent the arm 229 and valve 200 indicate the five positions to and between which these parts can be moved as R Left, F Left, Neutral, F Right and R Right, the letters R and F being abbreviations of the words "feed" and "rapid traverse" respectively and the words "left" and "right" having reference to the direction of movement of the table 360. Preferably, the dogs N and N' are backed by springs 361 and 362 which hold the dogs in the positions shown for automatically actuating the arm 229, but which yield when the arm 229 is actuated by the manual control handle 270 (Fig. 11) to permit the operator to move the valve 200 out of its neutral position.

363 represents an electric motor arranged to drive the pump shaft 30 through a coupling 364.

The table 360, as shown in Figs. 14 and 15, has depending end brackets 365 and 366 suitably bolted thereto. A feed screw 367 is rotatably mounted in these brackets and has squared ends 368 enabling it to be rotated manually for "set up" adjustments. The screw 367 passes through a pair of spaced stationary nuts 369 secured to the bed 370 of the machine.

A drive gear 371 is slidably keyed to the screw and is rotatably mounted on the bed 370. The drive from the transmission shaft 84 to the screw is completed by suitable gearing indicated by the numerals 372, 373, 374, 375, and 376. This gearing connecting the transmission shaft 84 to the table is shown by way of illustration herein and forms the subject matter of a co-pending application of Gustaf H. Ekstrom and Bengt R. Granberg Serial No. 323,780, filed March 13, 1940.

The operation of the invention will now be described, assuming the motor 363 to be in operation and a fluid such as oil in the hydraulic circuit. In the various views the parts are generally shown in the positions corresponding with the valve 200 which is shown in its neutral or stop position. With the valve 200 in neutral (Figs. 15 and 18), the pump wobbler 29 is in its neutral or no-stroke position and the motor wobbler 39 is in its maximum stroke position. The feed traverse piston 95 is shifted toward the right (Fig. 15) in its cylinder 96 so that the gearing is in operation to reduce the speed of the output shaft 84 with respect to the motor shaft 35, fluid under pressure from the make-up pump then passing through the conduits 314, 316 and 320 to the groove 213 in the valve bore 201, thence through the annular recess 209 in the valve to the longitudinal valve port 207, through the valve recess 210 to the groove 216 and thence through conduits 331 and 330 to the left hand end of the cylinder 96. At the same time fluid under pressure passes from the conduit 330 through the conduit 332 to the cylinder 145 to move the piston 144 toward the right, this piston then acting through the lever 159 to move the plunger 158 toward the left into abutment with both of the pistons 141 and 147 and to insure that they are in the position which causes the lever 119 to place the pump wobbler 29 in its no-stroke position. Fluid is also admitted from the longitudinal port 207 of the valve 200 through valve recess 208 and groove 211 to conduit 333 which communicates at its other end with a chamber 288 in which the right hand end of the plunger 158 is located and which connects with the left hand ends of cylinders 165 and 166. This permits the control fluid to exert a pressure against the plunger 158 which also moves it toward the left, supplementing the action of the piston 144, and to urge the pistons 167 and 168 to the right. In order to prevent the motor from being locked against rotation when the pump wobbler 29 is in its zero stroke position, the valve 200 functions through its annular recess 219 to connect annular grooves 217 and 218 in the valve bore 201 and thereby establish communication between the conduits 326 and 325 which connect respectively with said grooves. Since conduit 325 connects to one pump-motor passage through the conduit 323 and the conduit 326 connects to the other pump-motor passage through the conduit 324, circulation of fluid is permitted between the motor inlet and outlet ports and it is possible for an operator to rotate the motor shaft (or the table feed screw which is connected thereto) manually.

Generally, a milling machine table is operated at a rapid traverse rate in a forward direction (to the right in Figs. 14 and 15) to present the work to the cutter, thereafter at a feed rate during the cutting operation and then at a rapid traverse rate in the opposite direction to return the table to its initial position wherein it is stopped. The set of dogs illustrated in Fig. 15 is arranged for a continuous skip-feed milling cycle. The cycle is referred to as "continuous" because it occurs during a forward movement of the table and is then repeated in a reverse direction. The cycle is referred to as "skip-feed" because it includes, in sequence, (1) rapid traverse right, (2) feed right, (3) rapid traverse right, and (4) feed right so that spaced apart portions of a single work piece (or separate work pieces) may be milled during movement of the table in a forward direction. Each half of the cycle consists of "rapid traverse—feed—rapid traverse—feed—automatic reverse and rapid traverse return—and stop." It should be understood that many well known cycles may be obtained, the one selected being considered exemplary only.

Figure 24:
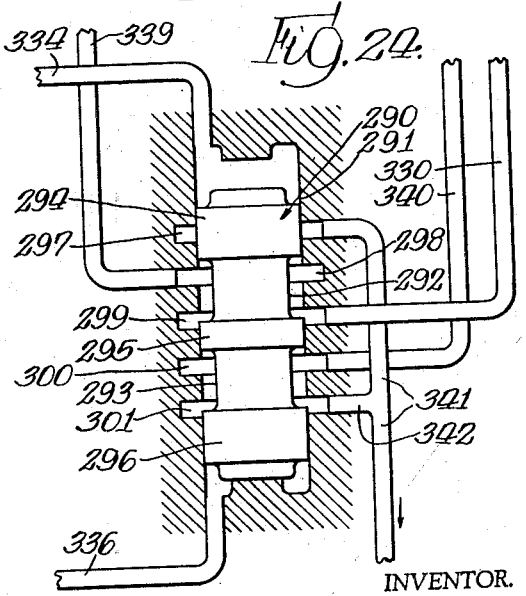

Assuming that the operator grasps the handle 270 to start a cycle of operation he does so by moving the handle towards the right (Fig. 10) to its extreme position, thereby moving the valve 200 to the left (Figs. 7, 15 and 16) and the dog operated arm 229 in a counter-clockwise direction to their "R Right" positions. With the valve 200 in this position fluid is supplied to the right end of the feed-traverse cylinder 96 from conduit 320, through groove 213, valve recess 209, valve port 207, valve recess 210, groove 215 and conduit 329. Fluid is supplied to piston 141 to adjust the pump wobbler to its maximum stroke position and the motor wobbler to its minimum stroke position, from conduit 320, through valve recess 209, groove 212, conduit 334 and conduit 335. Fluid from conduit 334 also enters the upper end of valve bore 291 and moves valve 290 down (Fig. 24). This relieves the pressure in the right hand end of feed control cylinder 166 through conduit 340, groove 300, recess 293 and conduits 342 and 341. Simultaneously the pressure is relieved in the right hand end of feed control cylinder 165 through conduit 339, groove 298, recess 292, conduit 330, conduit 331, groove 216, valve recess 206, valve port 202, chamber 287 and conduit 338. Since conduit 330 connects also to the left hand end of feed-traverse cylinder 96, and through conduit 332 to cylinder 145, pressure is also relieved in said cylinders. Pressure is relieved from the chamber 288 at the right hand end of plunger 158, through conduit 333, groove 211, recess 204 and valve port 202. The motor shaft 35 then rotates at its highest speed (wobbler 39 then being adjusted to minimum stroke position) and shaft 84 is connected to rotate in unison with motor shaft 35, to provide a rapid traverse movement of the table 360 towards the right. The operator need hold the handle 270 in its rapid traverse right position only until the dog N has slid off plunger 230 on arm 229, after which the handle 270 will remain in said position until the nearest dog FR engages the plunger 230 and rotates the arm 229 clockwise to its "F Right" position whereupon the valve 200 is moved to its corresponding position (Fig. 17) to continue the movement of the table to the right at a feed speed determined by the adjustment of the screw 169 and its associated feed control piston 167.

When the valve 200 is in its feed right position, fluid is supplied to the left hand end of feed-traverse cylinder 96 to render the reduction gearing effective, fluid continues to be supplied to piston 141 and the upper end of valve bore 291 and fluid is supplied to cylinder 145 and to the right hand end of feed control cylinder 165 to determine the feed speed. The fluid to the left hand end of cylinder 96 passes from conduit 320, through groove 213, valve recess 209, valve port 207, valve recess 210, groove 216 and conduits 331 and 330. Conduit 334 receives fluid from valve recess 209 to supply piston 141 and the upper end of valve bore 291. Fluid from conduit 330 passes through conduit 332 to cylinder 145 and urges piston 144 toward the right to assist the feed control piston 167 to limit the movement of the piston 141 toward the right. Pressure is relieved in the chamber 288 through conduit 333, groove 203, recess 204 and valve port 202. Since the feed selector valve is then down, fluid from conduit 330 passes through groove 299, valve recess 292, groove 298 and conduit 339 to the right hand end of cylinder 165 to move the feed control piston 167 toward the left and to hold it in the position determined by the head of the screw 169. The table then moves at a feed speed towards the right until the rapid traverse dog RR operates the arm 229 and moves the valve 200 back to its "R Right" position to effect a second rapid traverse movement of the table toward the right and until the second feed dog FR' operates the arm 229 to move the valve 200 back again to its "F Right" position. The feed movement of the table then continues until the end or reversing dog E engages and depresses the valve 275 (Fig. 21) whereupon the valve 200 is shifted to its "R Left" position (Fig. 20) to effect a rapid return of the table to its starting point as determined by the neutral or stop dog N.

Before the reversing dog E engages the valve 275 and when neither valve 275 nor valve 276 is depressed, the control unit piston 254 is in hydraulic balance, both ends of the piston being subjected to fluid at a common pressure. With valve 200 in its rapid right position the piston 254 is in its extreme right position against the end of the cylinder 255, with the result that groove 265 communicates with the left hand end of longitudinal valve recess 263. Fluid from the make-up pump 70 then passes through conduits 314, 316, 320, 321 and 322 to the valve bores 277 and 278. Fluid reaching valve bore 277 passes through valve recess 284, into groove 286 and then through conduit 355 to the left hand end of cylinder 255. Fluid reaching valve bore 278 passes through the recess 284 in valve 276, into groove 286 and then through conduit 357 to the right hand end of cylinder 255. Although fluid in the left hand end of cylinder 255 can pass through port 261, recess 259, groove 265 and into conduit 354, the groove 285 is closed by the valve 275. Similarly fluid from the right hand end of cylinder 255 can pass through port 262, recess 260, groove 266, conduit 356 and into groove 285 but this groove is closed by the valve 276. Thus the pressures on the opposite ends of the piston 254 are normally balanced.

When, however, the end dog E depresses the valve 275, this valve moves downwardly in Figs. 10 and 15 (to the position of Fig. 21) and first acts to close the groove 286 and thereby cut it off from the fluid supply in conduit 321. The fluid supply is thus cut off from the left hand end of cylinder 255, but since the groove 286 is closed by valve 275, the fluid in the left hand end of cylinder 255 must exhaust through valve port 261, recess 259, longitudinal recess 263, conduit 354, groove 285, recess 283, longitudinal port 280, chamber 281, conduit 350, chamber 351 and conduit 352. Since the valve 275 is generally operated by the end dog E when the table 360 is moving at a slow or feed rate of speed, the valve 275 moves downwardly rather slowly. In order to insure a shift of valve 200 through its neutral and left feed positions and all the way to its rapid traverse left position, means is provided for slowing down or retarding the movement of the piston 254 until the recess 283 in valve 275 has overlapped considerably the groove 285, and then shifting the piston 254 (and thereby the valve 200) quickly and fully to its rapid traverse left position. This means herein comprises the restricted recess 263 which serves to restrict the exhaust of fluid from the left end of cylinder 255 as it flows through port 261, recess 259, groove 265, recess 263 and conduit 354. By the time the piston 254 has moved sufficiently to the left to connect recess 259 directly to groove 265, the valve 275 has moved downwardly to open wide the groove 285 to the valve recess 283, whereupon further exhaust of the fluid from the left end of cylinder 255 is unrestricted and the piston 254, urged by the fluid under pressure in the right end of cylinder 255, shifts with a quick or snap action to its extreme left position, thereby moving valve 200 to its rapid traverse left position "R Left" (Fig. 20). The rapid traverse left movement effects a rapid return of the table 360 to its starting point where the neutral dog N engages the plunger 230 on arm 229 and returns the arm and other parts to the positions shown in Fig. 15. As soon as the table moves to the left sufficiently for the dog E to ride off valve 275 this valve returns to the extended position shown wherein the piston 254 is hydraulically balanced.

Figure 23:
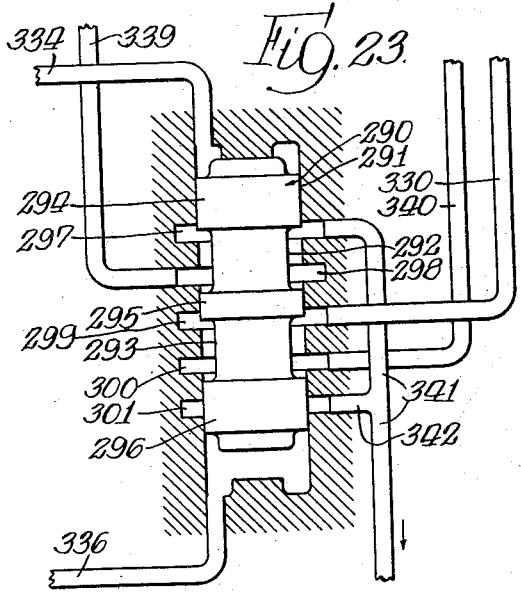
Figs. 23 and 24 are enlarged diagrammatic views illustrating two positions of another valve.

In obtaining the rapid traverse to the left fluid under pressure is supplied to the reversing piston 147 in cylinder 146 from the conduit 320, groove 213, recess 209, groove 214, and conduits 336 and 337. This shifts the pump wobbler to its maximum stroke position in a counter-clockwise direction from the position of Fig. 15. Fluid from recess 209 also flows through groove 215 and conduit 329 to the right end of cylinder 96 to shift piston 95 to the left for direct or traverse drive. Fluid from conduit 336 also flows to the lower end of the feed selector valve bore 291 to move the valve back up to the position shown in Figs. 15 and 23. Since the conduit 330 is connected to exhaust, however, no fluid is supplied to the reverse feed piston 168. Conduit 330 exhausts through conduit 331, groove 216, valve recess 205, and valve port 207 to chamber 287 and conduit 338. Pressure in cylinder 142 is also relieved through conduits 335 and 334, groove 212, recess 204 and valve port 202.

When the table has returned and stopped, it may be started on a left hand cycle by manual operation of the handle 270 toward the left (Fig. 10) to its extreme left position.

The cycle of table movements which includes feed movements towards the left differs from the cycle just described in that the movements of arm 229 and valve 200 are on the opposite side of their neutral positions. Since the rapid traverse left has just been described and the final reversal of the table by dog E' operating valve 276 (Fig. 22) is analogous to the reversal effected by dog E, it is believed sufficient to complete the description of the operation by describing the positions of the parts when the valve 200 has been moved to its feed left position "F Left" (Fig. 19) as by movement of the arm 229 by the feed dog FL.

In the F Left position of the valve 200 (Fig. 19) the feed-traverse piston 95 is moved to its right or feed position by fluid passing from conduit 320 to groove 213, through recess 209, valve port 207, recess 210, groove 216, and conduit 331 to conduit 330. Fluid from conduit 330 also passes through conduit 332 to cylinder 145, and to groove 299 in feed selector valve bore 291. From groove 299 fluid passes through recess 293, groove 300 and conduit 340 to the right hand end of cylinder 166 to move the feed control piston 168 therein to its wobbler limiting position as determined by the head of the screw 170. The table then moves to the left at a feed speed.

In connection with the operation of the preferred form of the invention, it may be said that the stroke of the feed-traverse piston 95 to shift from feed to traverse, is extremely short, for example, a few thousandths of an inch. Thus this piston shifts extremely rapidly from one position to another so that in operation the piston 95 will always complete its shift prior to the completion of the shifts of other control pistons. When the valve 200 is shifted from a rapid traverse position to its neutral or stop position the piston 95 shifts to its feed position so that the reduction gearing assists in slowing down the table. The fast shifting of the piston 95 before shifting of the stroke changing pistons for the pump and motor reduces wear on the clutch and brake surfaces.

I claim as my invention:

1. A machine tool having, in combination, a movable support, pressure fluid operated means for moving said support, and means for controlling the supply of pressure fluid to said means comprising a main valve, an operating member connected to said valve and located adjacent to one longitudinal edge of said support, a first set of dogs on said support adapted to move said member in opposite directions and to various points to change the speed of the support, a piston and cylinder device for moving said member to the limit of its movement in opposite directions to reverse the support, means for controlling said piston and cylinder device to obtain snap action thereof through its mid-position including two dog operated valves and means for retarding the movement of the piston when away from its mid-position in the cylinder, and dogs on said support to operate the last mentioned valves.

2. A machine tool having, in combination, a movable support, pressure fluid operated means for reciprocating said support, and means for controlling the supply of pressure fluid to said means comprising a main valve having a plurality of positions including a neutral position, an operating member connected to said valve and located adjacent to one longitudinal edge of said support, a first dog on said support adapted to move said member to change the speed of the support, a piston and cylinder device for moving said member through the neutral position of said valve to the limit of its movement in opposite directions to reverse the support, two valves controlling said piston and cylinder device, dogs on said support to operate the last mentioned valves, and means including a piston controlled restricted passage of limited length for retarding the initial movement only of said piston when one of said two valves is operated by a dog to reverse the support.

3. In a machine tool having a base, a support movably mounted thereon, means for moving said support, and means for controlling said moving means including a control member movably mounted on the base adjacent said support, the combination of a piston connected to said control member, a cylinder on said base for the piston, means for supplying fluid under pressure to the opposite ends of said piston normally to maintain the piston in hydraulic balance including a pair of dog operated valves, one associated with each end of said cylinder and functioning when actuated to shut off the flow of fluid to one end of the piston and to exhaust the fluid in that end to permit a shift of the piston by the fluid in the opposite end of the cylinder, and means for retarding the exhaust of fluid from said one end of the cylinder to retard the movement of the piston and enable the dog operated valve to open fully.

4. In a machine tool having a base, a support movably mounted thereon, means for moving said support, and means for controlling said moving means including a control member movably mounted on the base adjacent said support, the combination of a piston connected to said control member, a cylinder on said base for the piston, means for supplying fluid under pressure to the opposite ends of said piston normally to maintain the piston in hydraulic balance including a pair of dog operated valves, one associated with each end of said cylinder and functioning when actuated to shut off the flow of fluid to one end of the piston and to exhaust the fluid in that end to permit a shift of the piston by the fluid in the opposite end of the cylinder, and means including a piston controlled restricted passage for retarding the exhaust of fluid from said one end of the cylinder to retard the movement of the piston and enable the dog operated valve to open fully.

5. In a machine tool having a base, a support movably mounted thereon, means for moving said support, and means for controlling said moving means including a control member movably mounted on the base adjacent said support, the combination of a piston connected to said control member, a cylinder on said base for the piston, means for supplying fluid under pressure to the opposite ends of said piston normally to maintain the piston in hydraulic balance and alternatively to exhaust fluid from the opposite ends of the cylinder including a pair of dog operated valves, one associated with each end of said cylinder and functioning when actuated to shut off the flow of fluid to one end of the piston and to exhaust the fluid in that end to permit a shift of the piston by the fluid in the opposite end of the cylinder, exhaust passages for the ends of the cylinder having portions extending through the piston, and means on the piston for retarding the exhaust of fluid from said one end of the cylinder to retard the movement of the piston and enable the dog operated valve to open fully.

6. In a machine tool having a base, a support movably mounted thereon, fluid means for moving said support in forward and reverse directions, and means for controlling said fluid means including a reversing valve, a piston connected to said valve, a cylinder for said piston, means for supplying fluid under pressure to the opposite ends of said piston normally to maintain the piston in hydraulic balance including a pair of two-position valves each functioning in one position to supply fluid to one end of said piston, and each functioning in its other position to exhaust the fluid from one end of the cylinder to permit a shift of the piston by the fluid in the opposite end of the cylinder, and means for retarding the exhaust of fluid from the ends of the cylinder to retard the shifting movement of said reversing valve by said piston including longitudinal recesses in the periphery of said piston forming portions of the exhaust passages from the ends of said cylinder when the piston is out of its mid-position in the cylinder.

7. In a machine tool having a base, a support movably mounted thereon, fluid means for moving said support in forward and reverse directions, and means for controlling said fluid means including a reversing valve, a piston connected to said valve, a cylinder for said piston, means for supplying fluid under pressure to the opposite ends of said piston normally to maintain the piston in hydraulic balance including a pair of two-position valves each functioning in one position to supply fluid to one end of said piston, and each functioning in its other position to open exhaust passages for the fluid from one end of the cylinder to permit a shift of the piston by the fluid in the opposite end of the cylinder, and means for retarding the exhaust of fluid from the ends of the cylinder to retard the shifting movement of said reversing valve by said piston including longitudinal recesses in the periphery of said piston cooperating with annular grooves in the cylinder to form restricted portions in the exhaust passages when the piston moves toward its mid-position in the cylinder.

8. A machine tool having, in combination, a base, a support reciprocably mounted on said base, means for reciprocating said support including a variable displacement fluid pump, a fluid motor having its inlet and outlet ports connected directly to the pump outlet and inlet ports, a fluid circuit for controlling the pump and motor including a main control valve having feed, rapid traverse, and neutral positions, means effective when the valve is in its neutral position to adjust the pump displacement to zero, and means effective when the valve is in its neutral position to interconnect the inlet and outlet ports of the motor to permit manual rotation of the motor shaft.

9. A machine tool having, in combination, a base, a support reciprocably mounted on said base, and mechanism for reciprocating said support at feed and rapid traverse rates comprising a fluid motor, a variable displacement reversible flow pump for supplying fluid to said motor, means for driving said pump, and means for controlling the movements of said support including piston and cylinder means for changing pump displacement, a first piston and cylinder device for determining the rate of movement of the support in a forward direction, a second piston and cylinder device for determining the rate of movement of the support in a reverse direction, a main control valve having a central neutral position, forward feed and rapid traverse positions on one side of neutral and reverse feed and rapid traverse positions on the other side of neutral, a dog operated member for shifting said valve to and between said positions, a fluid operated valve under the control of said main valve for rendering said first piston and cylinder device or said second piston and cylinder device effective to determine the feed speed of said support, and a fluid circuit enabling said main control valve in its feed positions to shift the piston selected by said fluid operated valve to determine the rate of such feed movements, and enabling said main control valve in its rapid traverse positions to effect shifting of said piston and cylinder means to obtain rapid traverse movements of said support and simultaneously to render said first and second pistons ineffective.

10. A machine tool having, in combination, a base, a support reciprocably mounted on said base, and mechanism for reciprocating said support at feed and rapid traverse rates comprising a fluid motor, a variable displacement reversible flow pump for supplying fluid to said motor, means for driving said pump, and means for controlling the movements of said support including means for changing pump displacement, a first piston and cylinder device for determining the rate of movement of the support in a forward direction, a second piston and cylinder device for determining the rate of movement of the support in a reverse direction, a main control valve having a central neutral position, forward feed and rapid traverse positions on one side of neutral and reverse feed and rapid traverse positions on the other side of neutral, means for shifting said valve to and between said positions, a fluid operated valve under the control of said main valve for rendering said first piston and cylinder device or said second piston and cylinder device effective to determine the feed speed of said support, and a fluid circuit enabling said main control valve in its feed positions to shift the piston selected by said fluid operated valve to determine the rate of such feed movements.

11. A machine tool having, in combination, a base, a support reciprocably mounted on said base, and mechanism for reciprocating said support at feed and rapid traverse rates comprising a fluid motor, a variable displacement reversible flow pump for supplying fluid to said motor, means for driving said pump, speed change gearing connecting the motor shaft to move the support, and means for controlling the movements of said support including a means for changing pump displacement, a first piston and cylinder device for determining the feed rate of movement of the support in a forward direction, a second piston and cylinder device for determining the feed rate of movement of the support in a reverse direction, a third piston and cylinder device for shifting said speed change gearing to obtain feed and rapid traverse movements of the support, a main control valve having a central neutral position, forward feed and rapid traverse positions on one side of neutral and reverse feed and rapid traverse positions on the other side of neutral, and a fluid circuit enabling said main control valve in its feed positions to shift said third piston to obtain feed movements of said support and simultaneously to shift the first or second piston to determine the rate of such feed movements, and enabling said main control valve in its rapid traverse positions to shift said third piston and cylinder device to obtain rapid traverse movements of said support.

12. A machine tool having, in combination, a base, a support reciprocably mounted on said base, and mechanism for reciprocating said support at feed and rapid traverse rates, comprising a fluid motor, a variable displacement reversible flow pump for supplying fluid to said motor, means for driving said pump, speed change gearing connecting the motor shaft to move the support, and means for controlling the movements of said support including a piston and cylinder means for changing pump displacement, a first piston and cylinder device for determining the rate of movement of the support in a forward direction, a second piston and cylinder device for determining the rate of movement of the support in a reverse direction, a third piston and cylinder device for shifting said speed change gearing to obtain feed and rapid traverse movements of the support, a main control valve having a central neutral position, forward feed and rapid traverse positions on one side of neutral and reverse feed and rapid traverse positions on the other side of neutral, a dog operated member for shifting said valve to and between said positions, a fourth piston and cylinder device for actuating said main valve to reverse the support, a pair of dog operated valves for controlling the supply and exhaust of fluid to and from the ends of said fourth cylinder, a fluid operated valve under the control of said main valve for rendering said first piston and cylinder device or said second piston and cylinder device effective to determine the feed speed of said support, and a fluid circuit enabling said main control valve in its feed positions to shift said third piston to obtain feed movements of said support and simultaneously to shift the piston selected by said fluid operated valve to determine the rate of such feed movements, enabling said main control valve in its rapid traverse positions to shift said third piston and cylinder device to obtain rapid traverse movements of said support, and enabling said main control valve when in its neutral position to stop the support.

13. A machine tool having, in combination, a base, a support reciprocably mounted on said base, and mechanism for reciprocating said support at feed and rapid traverse rates comprising a fluid motor, a variable displacement reversible flow pump for supplying fluid to said motor, means for driving said pump, speed change gearing connecting the motor shaft to move the support, and means for controlling the movements of said support including a piston and cylinder means for changing pump displacement, a first piston and cylinder device for determining the rate of movement of the support in a forward direction, a second piston and cylinder device for determining the rate of movement of the support in a reverse direction, a third piston and cylinder device for shifting said speed change gearing to obtain feed and rapid traverse movements of the support, a main control valve having a central neutral position, forward feed and rapid traverse positions on one side of neutral and reverse feed and rapid traverse positions on the other side of neutral, a fluid operated valve under the control of said main valve for rendering said first piston and cylinder device or said second piston and cylinder device effective to determine the feed speed of said support, and a fluid circuit enabling said main control valve to control the movements of the support.

14. A machine tool having, in combination, a base, a support reciprocably mounted on said base, and mechanism for reciprocating said support at feed and rapid traverse rates comprising a fluid motor, a variable displacement reversible flow pump for supplying fluid to said motor, means for driving said pump, and means for controlling the movements of said support including a piston and cylinder means for changing pump displacement, a first piston and cylinder device for determining the rate of feed movement of the support in a forward direction, a second piston and cylinder device for determining the rate of feed movement of the support in a reverse direction, a main control valve having a central neutral position, forward feed and rapid traverse positions on one side of neutral and reverse feed and rapid traverse positions on the other side of neutral, a fluid operated valve under the control of said main valve for rendering said first piston and cylinder device or said second piston and cylinder device effective to determine the feed speed of said support, and a fluid circuit enabling said main control valve to control the movements of the support.

15. A machine tool having, in combination, a base, a support reciprocably mounted on said base, and mechanism for reciprocating said support comprising a fluid motor, a variable displacement reversible flow pump for supplying fluid to said motor, means for driving said pump, and means for controlling the movements of said support including fluid means for changing and reversing pump displacement, a first piston and cylinder device for determining the rate of movement of the support in a forward direction, a second piston and cylinder device for determining the rate of movement of the support in a reverse direction, a main control valve having a central neutral position and forward and reverse positions on opposite sides of neutral, a fluid operated valve under the control of said main valve for rendering said first piston and cylinder device or said second piston and cylinder device effective to determine the speed of said support, and a fluid circuit enabling said main control valve in its forward and reverse positions to shift simultaneously said fluid means and the piston selected by said fluid operated valve.

16. A machine tool having, in combination, a base, a support movably mounted on said base, and mechanism for driving said support at feed and rapid traverse rates comprising a fluid motor, a variable displacement pump for supplying fluid to said motor, means for driving said pump, speed change gearing connecting the motor shaft to move the support, and means for controlling the movements of said support including a piston and cylinder means for changing pump displacement, a first piston and cylinder device for shifting said speed change gearing to obtain feed and rapid traverse movements of the support, a second piston and cylinder device for determining the rate of movement of the support when said speed change gearing is shifted to obtain feed movement of the support, and a control circuit including said piston and cylinder means and said first and second piston and cylinder devices, and a main control valve having stop, feed and rapid traverse positions and operable when in rapid traverse position to cause said speed change gearing to effect movement of the support at a traversing rate and when in feed position to cause actuation of both said speed change gearing and said second piston and cylinder device to effect movement of the support at the feed rate determined by said second piston and cylinder device.

17. A machine tool having, in combination, a base, a support reciprocably mounted on said base, and mechanism for reciprocating said support at feed and rapid traverse rates comprising a fluid motor, a reversible flow pump for supplying fluid to said motor, means for driving said pump, speed change gearing connecting the motor shaft to move the support, and means for controlling the movements of said support including piston and cylinder means for reversing flow from the pump, a piston and cylinder device for shifting said speed change gearing to obtain feed and rapid traverse movements of the support, and a control circuit including said piston and cylinder means and said piston and cylinder device, and a single main control valve having a central neutral position, forward feed and rapid traverse positions on one side of neutral, and reverse feed and rapid traverse positions on the other side of neutral and governing both said piston and cylinder means and said piston and cylinder device to determine the rate and direction of movement of the support.

18. A machine tool having, in combination, a base, a support reciprocably mounted on said base, a drive shaft connected to said support, a pump, means for driving the pump, a variable displacement motor operable by the fluid output of said pump, speed change gearing intermediate the motor shaft and the drive shaft, fluid operated means for reversing the output of said pump, fluid operated means for varying the displacement of said motor, fluid operated means for effecting a direct drive or alternatively a speed reduction in said speed change gearing, and means including a main valve device for controlling said fluid operated means.

19. A machine tool having, in combination, a base, a support reciprocably mounted on said base, and mechanism for reciprocating said support comprising a fluid motor, a variable displacement reversible flow pump for supplying fluid to said motor, means for driving said pump, and means for controlling the movement of said support including piston and cylinder means for determining forward or reverse movement of the support, means for determining the rate of movement of the support in a forward direction including a first piston and cylinder device, means for determining the rate of movement of the support in a reverse direction including a second piston and cylinder device, a main control valve having a neutral position, a forward position and a reverse position, a fluid operated valve under the control of said main valve for rendering said first piston and cylinder device or said second piston and cylinder device effective to determine the rate of movement of the support in accordance with the direction of movement of the support, and a fluid circuit enabling said main control valve to shift the piston selected by said fluid operated valve to determine the rate of movement.

20. A machine tool having, in combination, a base, a support movably mounted on said base, and mechanism for driving said support comprising a fluid motor, a variable displacement pump for supplying fluid to said motor, means for driving said pump, and means for controlling the movements of said support including a first piston and cylinder means for changing pump displacement from zero to maximum, a second piston and cylinder means operable when supplied with fluid under pressure to resist increase in pump displacement, and a control circuit including said piston and cylinder means and a main control valve having a neutral and a rapid traverse position, said valve being operable when in neutral position to exhaust pressure fluid from said first piston and cylinder means and to supply pressure fluid to said second piston and cylinder means to assure return of the pump to zero displacement, and operating when in rapid traverse position to exhaust pressure fluid from said second piston and cylinder means and to supply pressure fluid to said first piston and cylinder means to assure operation of the pump at maximum displacement.

21. In a machine tool having, in combination, a base, a support reciprocably mounted on said base, and mechanism for reciprocating said support at feed and rapid traverse rates comprising a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position, a reciprocably mounted plunger connected to said motor control element and disposed to be abutted at one end and shifted by the tail end of either of the pistons of said pair of piston and cylinder devices, and manually adjustable hydraulically actuated means disposed to abut the plunger at its opposite end to limit the movement of the plunger under the influence of either of said pistons.

22. In a machine tool having, in combination, a base, a support reciprocably mounted on said base, and mechanism for reciprocating said support at feed and rapid traverse rates comprising a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position, a reciprocably mounted plunger connected to said motor control element and disposed to be abutted at one end and shifted by the tail end of either of the pistons of said pair of piston and cylinder devices, a pair of manually adjustable hydraulically actuated piston devices disposed when in operative position to abut the opposite end of said plunger to limit the extent of movement of the plunger under the influence of either of said pair of pistons, and means supplying fluid between said plunger and said manually adjusted piston devices to return said last mentioned devices to inoperative position and through said plunger to return said pair of pistons to neutral position.

23. A machine tool having, in combination, a movable support, pressure fluid operated means for reciprocating said support, and means for controlling the supply of pressure fluid to said means comprising a main valve having a plurality of positions including a neutral position, an operating member connected to said valve and located adjacent to one longitudinal edge of said support, a first dog on said support adapted to move said member to change the speed of the support, a piston and cylinder device for moving said member through the neutral position of said valve to the limit of its movement in opposite directions to reverse the support, said piston and cylinder device having a neutral position which it assumes when said valve is in neutral position and being on either side of neutral when the machine tool is in operation, two valves controlling said piston and cylinder device, dogs on said support to operate the last mentioned valves, and means including a restricted piston controlled passage exercising control over the fluid acting on the piston of said device to retard the movement of the piston toward neutral to a point short of neutral when one of said two valves is operated by a dog to reverse the support.

GUNNAR A. WAHLMARK.